United States Patent
Bae et al.

(10) Patent No.: US 11,289,050 B2
(45) Date of Patent: *Mar. 29, 2022

(54) CONTROLLER AND DISPLAY DEVICE INCLUDING THE SAME

(71) Applicant: SILICON WORKS CO., LTD., Daejeon (KR)

(72) Inventors: Dae Hee Bae, Daejeon (KR); Bo Sung Kim, Daejeon (KR); Jun Hun Park, Daejeon (KR); Ji Hong Yuk, Daejeon (KR); Sung Woo Han, Daejeon (KR); Ji Hoon Choi, Daejeon (KR)

(73) Assignee: SILICON WORKS CO., LTD., Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/993,783

(22) Filed: Aug. 14, 2020

(65) Prior Publication Data

US 2021/0049980 A1 Feb. 18, 2021

(30) Foreign Application Priority Data

Aug. 16, 2019 (KR) .......................... 10-2019-0100425
Aug. 4, 2020 (KR) .......................... 10-2020-0097265

(51) Int. Cl.
*G09G 5/10* (2006.01)
*G09G 3/20* (2006.01)

(52) U.S. Cl.
CPC ............. *G09G 5/10* (2013.01); *G09G 3/2074* (2013.01); *G09G 2300/0452* (2013.01); *G09G 2310/0232* (2013.01); *G09G 2320/0626* (2013.01); *G09G 2320/0686* (2013.01); *G09G 2340/0407* (2013.01); *G09G 2340/0457* (2013.01)

(58) Field of Classification Search
CPC ... G09G 2340/0407; G09G 2310/0232; G09G 2320/0626–0653; G09G 2320/0686; G09G 3/2074; G09G 5/10
See application file for complete search history.

(56) References Cited

U.S. PATENT DOCUMENTS

| 8,539,341 | B2 * | 9/2013 | Barclay | G06F 3/147 |
| | | | | 715/243 |
| 10,395,581 | B2 * | 8/2019 | Kim | G09G 3/2074 |
| 10,460,656 | B2 * | 10/2019 | Xi | G09G 3/3225 |
| 10,607,549 | B2 * | 3/2020 | Aflatooni | G09G 3/3275 |
| 10,769,991 | B2 * | 9/2020 | Ka | G09G 3/3225 |

(Continued)

FOREIGN PATENT DOCUMENTS

KR 10-2018-0049458 A 5/2018

*Primary Examiner* — Patrick F Marinelli
(74) *Attorney, Agent, or Firm* — Harness, Dickey & Pierce, P.L.C.

(57) ABSTRACT

Disclosed is a display device including a display panel having a plurality of pixels, the display panel including a first display area having first resolution and a second display area having second resolution, the second resolution being lower than the first resolution, and a controller configured to generate border information of pixels provided in a border area located within a predetermined range from the border between the first display area and the second display area, to correct an image that is displayed in the border area based on the border information, and to perform control such that the corrected image is displayed on the display panel.

20 Claims, 12 Drawing Sheets

(56) References Cited

U.S. PATENT DOCUMENTS

| | | | |
|---|---|---|---|
| 10,909,412 B2* | 2/2021 | Kim | G06K 9/3216 |
| 2009/0113291 A1* | 4/2009 | Barclay | G06F 3/03547 |
| | | | 715/243 |
| 2018/0012566 A1* | 1/2018 | Lin | G09G 5/10 |
| 2018/0122283 A1* | 5/2018 | Kim | G09G 3/2003 |
| 2018/0190190 A1* | 7/2018 | Xi | G09G 3/3225 |
| 2019/0073962 A1* | 3/2019 | Aflatooni | G09G 3/3275 |
| 2019/0251388 A1* | 8/2019 | Kim | G06F 1/1686 |
| 2019/0340974 A1* | 11/2019 | Ka | G09G 3/3233 |
| 2020/0052059 A1* | 2/2020 | Chen | H01L 27/3213 |
| 2020/0160775 A1* | 5/2020 | Zhang | G02F 1/13306 |
| 2020/0202791 A1* | 6/2020 | Aflatooni | G09G 3/3275 |
| 2020/0335023 A1* | 10/2020 | Yen | G09G 5/14 |
| 2020/0380917 A1* | 12/2020 | Zhu | H01L 27/3262 |
| 2021/0013298 A1* | 1/2021 | Her | H01L 27/3225 |
| 2021/0019103 A1* | 1/2021 | Bai | G09G 3/20 |
| 2021/0033937 A1* | 2/2021 | Wu | G09G 3/2092 |
| 2021/0049945 A1* | 2/2021 | Bae | G09G 3/20 |
| 2021/0049950 A1* | 2/2021 | Bae | G09G 3/2003 |
| 2021/0049955 A1* | 2/2021 | Bae | G09G 3/32 |
| 2021/0049980 A1* | 2/2021 | Bae | G09G 5/10 |
| 2021/0065606 A1* | 3/2021 | Park | G09G 3/2007 |

* cited by examiner

FIG. 6

| | | Bits Index | | | | | | | |
|---|---|---|---|---|---|---|---|---|---|
| | | 7 | 6 | 5 | 4 | 3 | 2 | 1 | 0 |
| Bytes Index | 7 | X | X | line1 ld | line1 rd | line2 ld | line2 rd | line3 ld | line3 rd |
| | 6 | line1 left stair width | | | | line1 right stair width | | | |
| | 5 | line2 left stair width | | | | line2 right stair width | | | |
| | 4 | line3 left stair width | | | | line3 right stair width | | | |
| | 3 | X | X | line4 ld | line4 rd | line5 ld | line5 rd | line6 ld | line6 rd |
| | 2 | line4 left stair width | | | | line4 right stair width | | | |
| | 1 | line5 left stair width | | | | line5 right stair width | | | |
| | 0 | line6 left stair width | | | | line6 right stair width | | | |

FIG. 7

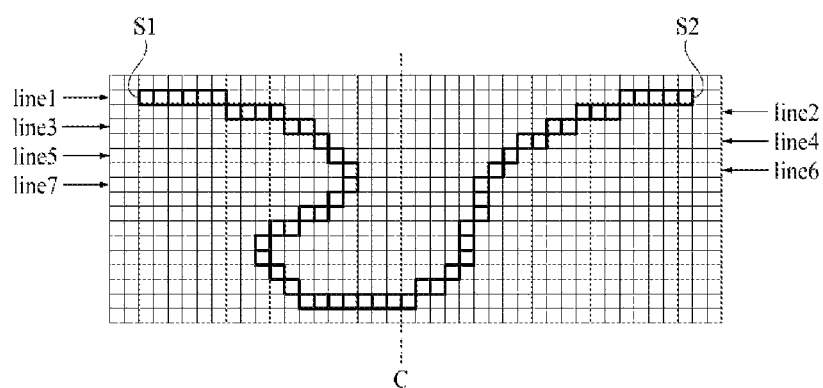

FIG. 8

|  | | colspan="8" | Bit Index |
|---|---|---|---|---|---|---|---|---|
|  | | 7 | 6 | 5 | 4 | 3 | 2 | 1 | 0 |
|  | 7 | X | X | 1 | 1 | 1 | 1 | 1 | 1 |
|  | 6 | colspan="4" | 6 | colspan="4" | 5 |
|  | 5 | colspan="4" | 4 | colspan="4" | 3 |
| Bytex | 4 | colspan="4" | 2 | colspan="4" | 2 |
| Index | 3 | X | X | 1 | 1 | 1 | 1 | 1 | 1 |
|  | 2 | colspan="4" | 1 | colspan="4" | 2 |
|  | 1 | colspan="4" | 1 | colspan="4" | 1 |
|  | 0 | colspan="4" | 0 | colspan="4" | 1 |

FIG. 11

CONTROLLER AND DISPLAY DEVICE INCLUDING THE SAME

CROSS-REFERENCE TO RELATED APPLICATIONS

This application claims the benefit of and priority to the Korean Patent Application Nos. 10-2019-0100425 filed on Aug. 16, 2019 and 10-2020-0097265 filed on Aug. 4, 2020, which are hereby incorporated by references as if fully set forth herein.

FIELD

The present disclosure relates to a controller and a display device including the same.

BACKGROUND

An electronic module, such as a camera module or a sensor module, may be mounted or installed in a display device. In the case in which an electronic module, such as a camera module or a sensor module, is mounted or installed in a display device, a camera hole may be formed in the display device, and the camera module may be disposed in the camera hole.

The camera hole may be disposed in a display area of the display device, in which an image is displayed. In this case, no image is displayed in the area in which the camera hole is formed, whereby the image displayed on the display device may be interrupted, which may be recognized by a user.

In addition, the camera hole may be disposed in a bezel area of the display device, in which case the bezel area increases.

SUMMARY

Therefore, the present disclosure relates to a controller that is capable of preventing problems resulting from limitations and shortcomings of the related art described above and a display device including the same.

It is an object of the present disclosure to provide a controller capable of performing control such that an image is displayed even in an area disposed so as to overlap a camera and a display device including the same.

It is another object of the present disclosure to provide a controller capable of efficiently controlling information about pixels provided in an area disposed so as to overlap a camera and a display device including the same.

It is another object of the present disclosure to provide a controller capable of controlling an image that is displayed in an area disposed so as to overlap a camera and a display device including the same.

It is another object of the present disclosure to provide a controller capable of preventing the occurrence of color difference at the border between a general display area and an area disposed so as to overlap a camera and a display device including the same.

In accordance with an aspect of the present disclosure, the above and other objects can be accomplished by the provision of a display device including a display panel having a plurality of pixels, the display panel including a first display area having first resolution and a second display area having second resolution, the second resolution being lower than the first resolution, and a controller configured to generate border information of pixels provided in a border area located within a predetermined range from the border between the first display area and the second display area, to correct an image that is displayed in the border area based on the border information, and to perform control such that the corrected image is displayed on the display panel.

In accordance with another aspect of the present disclosure, there is provided a controller including a border information generation unit configured to generate border information of pixels provided in a border area located within a predetermined range from the border between a first display area and a second display area having lower resolution than the first display area based on shape information of the second display area, an image processing unit configured to adjust luminance of image data of the border area based on the border information, and a control unit configured to perform control such that an image having the adjusted luminance is displayed on a display panel.

BRIEF DESCRIPTION OF THE DRAWINGS

The above and other objects, features and other advantages of the present disclosure will be more clearly understood from the following detailed description taken in conjunction with the accompanying drawings, in which:

FIG. 6 is a view illustrating left border information and right border information;

FIG. 7 is a view showing an example of a second display area having a U shape;

FIG. 8 is a view showing an example of shape information of the second display area shown in FIG. 7;

FIG. 11 is a view showing an example of a border area and border information of each of a plurality of pixels;

DETAILED DESCRIPTION

Hereinafter, embodiments of the present disclosure will be described in detail with reference to the accompanying drawings.

Figure 1:
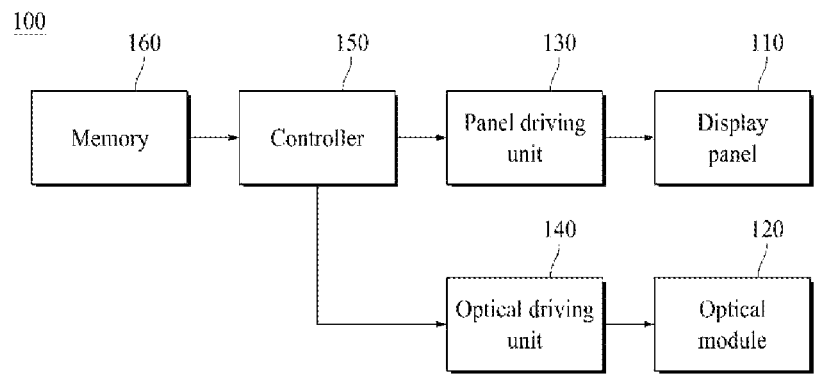
FIG. 1 is a view schematically showing the construction of a display device according to an embodiment of the present disclosure.
Figure 2:
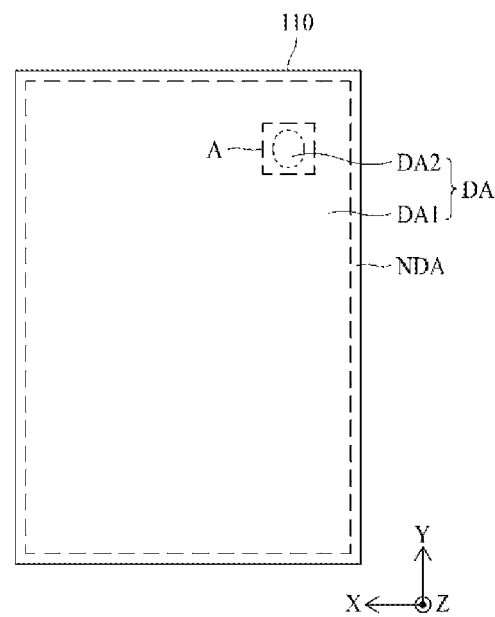
FIG. 2 is a plan view schematically showing a display panel of FIG. 1.
Figure 3:
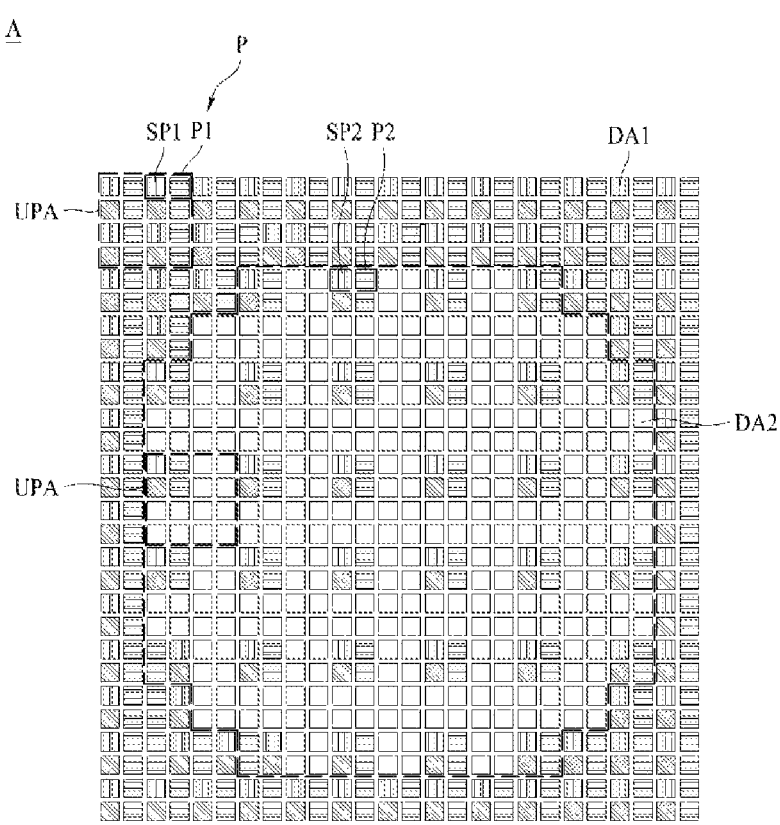
FIG. 3 is an enlarged view showing pixels provided in area A of FIG. 2.

FIG. 1 is a view schematically showing the construction of a display device 100 according to an embodiment of the present disclosure, FIG. 2 is a plan view schematically showing a display panel of FIG. 1, and FIG. 3 is an enlarged view showing pixels provided in area A of FIG. 2.

Referring to FIGS. 1 to 3, the display device 100 according to the embodiment of the present disclosure includes a display panel 110, an optical module 120, a panel driving unit 130, an optical driving unit 140, a controller 150, and a memory 160.

The display panel 110 includes a plurality of pixels, and displays a color image. The display panel 110 may be realized using an organic light-emitting display panel, a liquid crystal display panel, a plasma display panel, a quantum dot light-emitting display panel, or an electrophoretic display panel.

The display panel 110 may be divided into a display area DA, in which pixels are formed to display an image, and a non-display area NDA, which displays no image.

The non-display area NDA may be disposed so as to surround the display area DA. The panel driving unit 130, which supplies various kinds of signals to a plurality of signal lines in the display area DA, and a link unit (not shown), configured to connect the panel driving unit 130 and the plurality of signal lines to each other, may be formed in the non-display area NDA.

In the display area DA, a plurality of pixels is disposed to display an image. As shown in FIG. 2, the display area DA includes a first display area DA1 and a second display area DA2.

The first display area DA1 is an area that does not overlap an area CA, in which the optical module 120 is disposed, and displays an image irrespective of operation of the optical module 120. The first display area DA1 may be formed so as to have a large size.

A plurality of first pixels P1, each of which includes at least two first subpixels SP1, may be provided in the first display area DA1. Each of the plurality of first pixels P1 may include a light-emitting pixel. Specifically, each of the at least two first subpixels SP1, included in each of the first pixels P1, may be a light-emitting subpixel including a light-emitting device to emit a predetermined color of light. Each of the first pixels P1 may include at least two of a red subpixel configured to emit red light, a green subpixel configured to emit green light, and a blue subpixel configured to emit blue light. As an example, one of the first pixels P1 may include a red subpixel and a green subpixel, and an adjacent one of the first pixels P1 may include a blue subpixel and a green subpixel. As another example, each of the first pixels P1 may include a red subpixel, a green subpixel, and a blue subpixel.

The second display area DA2 overlaps the area CA, in which the optical module 120 is disposed, and an image to be displayed in the second display area DA2 may be decided depending on whether or not the optical module 120 is operated. Specifically, in the case in which the optical module 120 is not operated, the second display area DA2 may display an image together with the first display area DA1. In the case in which the optical module 120 is operated, on the other hand, the second display area DA2 may display no image or may display a black image. At this time, an image may be displayed in the first display area DA1.

The size, position, and shape of the second display area DA2 may be decided in consideration of the optical module 120. The second display area DA2 may be provided at the position corresponding to the optical module 120. In addition, the second display area DA2 may be provided so as to have a size including therein the area CA, in which the optical module 120 is disposed.

A plurality of second pixels P2, each of which includes at least two second subpixels SP2, may be provided in the second display area DA2. In the second display area DA2, the plurality of second pixels P2 may include light-emitting pixels and non-light-emitting pixels, unlike the first display area DA1. Each of the light-emitting pixels may be an area including a light-emitting device to emit light, and each of the non-light-emitting pixels may be an area including no light-emitting device and transmitting external light. That is, areas including no light-emitting devices and transmitting external light may be provided in the second display area DA2, unlike the first display area DA1.

Each of the at least two second subpixels SP2, included in each of the light-emitting pixels, among the second pixels P2, may be a light-emitting subpixel including a light-emitting device to emit a predetermined color of light. Each of the light-emitting pixels, among the second pixels P2, may include at least two of a red subpixel configured to emit red light, a green subpixel configured to emit green light, and a blue subpixel configured to emit blue light. As an example, one of the light-emitting pixels, among the second pixels P2, may include a red subpixel and a green subpixel, and an adjacent one of the light-emitting pixels, among the second pixels P2, may include a blue subpixel and a green subpixel. As another example, each of the light-emitting pixels, among the second pixels P2, may include a red subpixel, a green subpixel, and a blue subpixel.

Each of the at least two second subpixels SP2, included in each of the non-light-emitting pixels, among the second pixels P2, may be a non-light-emitting subpixel including no light-emitting device and transmitting external light.

As a result, the number of light-emitting subpixels provided in a unit pixel area UPA of the second display area DA2 may be less than the number of light-emitting subpixels provided in the unit pixel area UPA of the first display area DA1. For example, as shown in FIG. 3, four light-emitting subpixels may be provided in the unit pixel area UPA of the second display area DA2, whereas 16 light-emitting subpixels may be provided in the unit pixel area UPA of the first display area DA1.

Light transmittance of the second display area DA2 may be changed depending on the number of light-emitting subpixels provided in the unit pixel area UPA thereof. In the case in which the number of light-emitting subpixels provided in the unit pixel area UPA is increased, luminance and resolution of the second display area DA2 may increase, whereas light transmittance of the second display area DA2 may decrease. In the case in which the number of light-emitting subpixels provided in the unit pixel area UPA is decreased, on the other hand, luminance and resolution of the second display area DA2 may decrease, whereas light transmittance of the second display area DA2 may increase. In a display panel 110 according to an embodiment of the present disclosure, the number of light-emitting subpixels may be decided in consideration of luminance, resolution, and light transmittance of the second display area DA2.

The first display area DA1 and the second display area DA2, described above, may be different in transmittance and resolution from each other. The first display area DA1 may have first transmittance, and the second display area DA2 may have second transmittance, which is higher than the first transmittance. In addition, the first display area DA1 may have first resolution, and the second display area DA2 may have second resolution, which is lower than the first resolution.

The optical module 120 may be disposed at the rear surface of the display panel 110. The optical module 120 may be provided so as to overlap the display area DA, specifically the second display area DA2, of the display panel 110. The optical module 120 may include all components configured to use external light input through the display panel 110. For example, the optical module 120 may be a camera. However, the present disclosure is not limited thereto. The optical module 120 may be an ambient light sensor or a fingerprint sensor.

The panel driving unit 130 controls driving of the display panel 110 based on a control signal received from the controller 150. To this end, the panel driving unit 130 includes a gate driving unit and a data driving unit.

The gate driving unit generates gate signals for driving gate lines of the display panel 110 in response to a gate control signal received from the controller 150. The gate driving unit supplies the generated gate signals to the subpixels SP1 and SP2 of the pixels P1 and P2 included in the display panel 110 via the gate lines.

The data driving unit receives a data control signal and an image data signal from the controller 150. The data driving unit converts a digital-type image data signal into an analog-type image data signal in response to the data control signal received from the controller 150. The data driving unit supplies the converted image data signal to the subpixels SP1 and SP2 of the pixels P1 and P2 included in the display panel 110 via data lines.

The optical driving unit 140 controls driving of the optical module 120 based on a control signal received from the controller 150.

The memory 160 stores shape information of the second display area DA2. The shape information of the second display area DA2 includes position information of a starting point, vertical length information of the second display area, and line-based direction information and width information indicating the border of the second display area.

The controller 150 changes an image that is displayed in at least one of the first display area DA1 and the second display area DA2 of the display panel 110 using the shape information of the second display area DA2 stored in the memory 160. Specifically, the controller 150 may generate display area information and border information of each of the plurality of pixels using the shape information of the second display area DA2. The controller 150 may change an image that is displayed on the display panel 110 using at least one of the display area information and the border information of each of the plurality of pixels, and may perform control such that the corrected image is displayed on the display panel 110.

Hereinafter, the shape information of the second display area DA2 stored in the memory 160 and information that is generated by the controller 150 will be described in more detail with reference to FIGS. 4 to 12.

Figure 4:
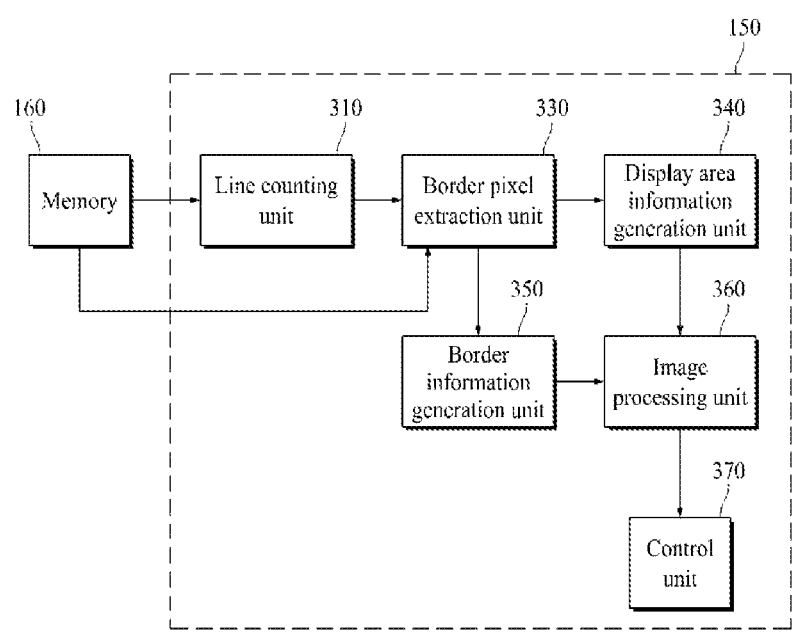
FIG. 4 is a view showing the construction of a memory and a controller.
Figure 5A:
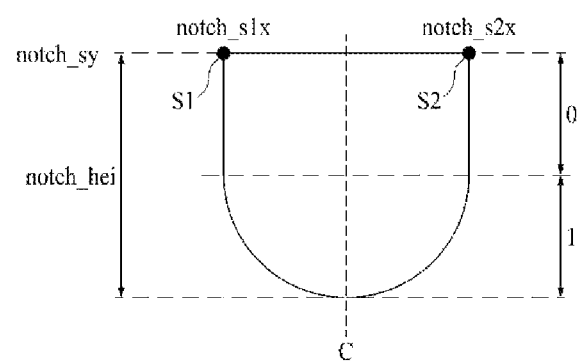
FIG. 5A is a view illustrating a starting point and vertical length and direction information of a second display area when the second display area has a U shape.
Figure 5B:
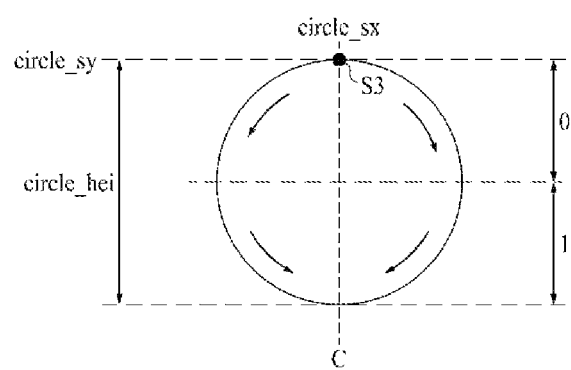
FIG. 5B is a view illustrating a starting point and vertical length and direction information of a second display area when the second display area has a circular shape.
Figure 9:
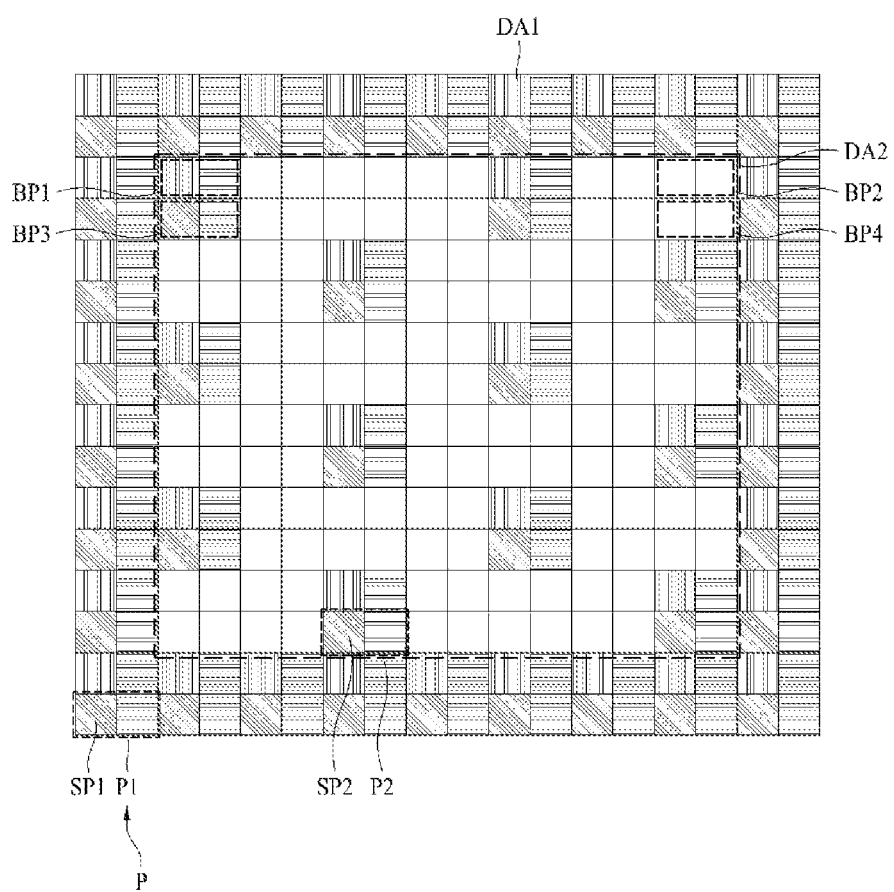
FIG. 9 is a view illustrating a border pixel.
Figure 10:
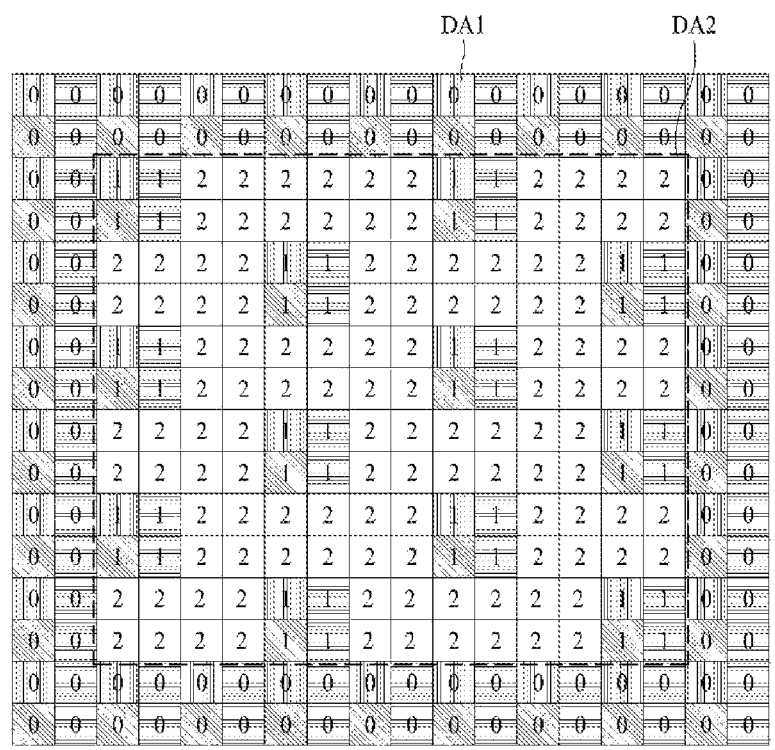
FIG. 10 is a view showing an example of display area information of each of a plurality of subpixels.
Figure 11:
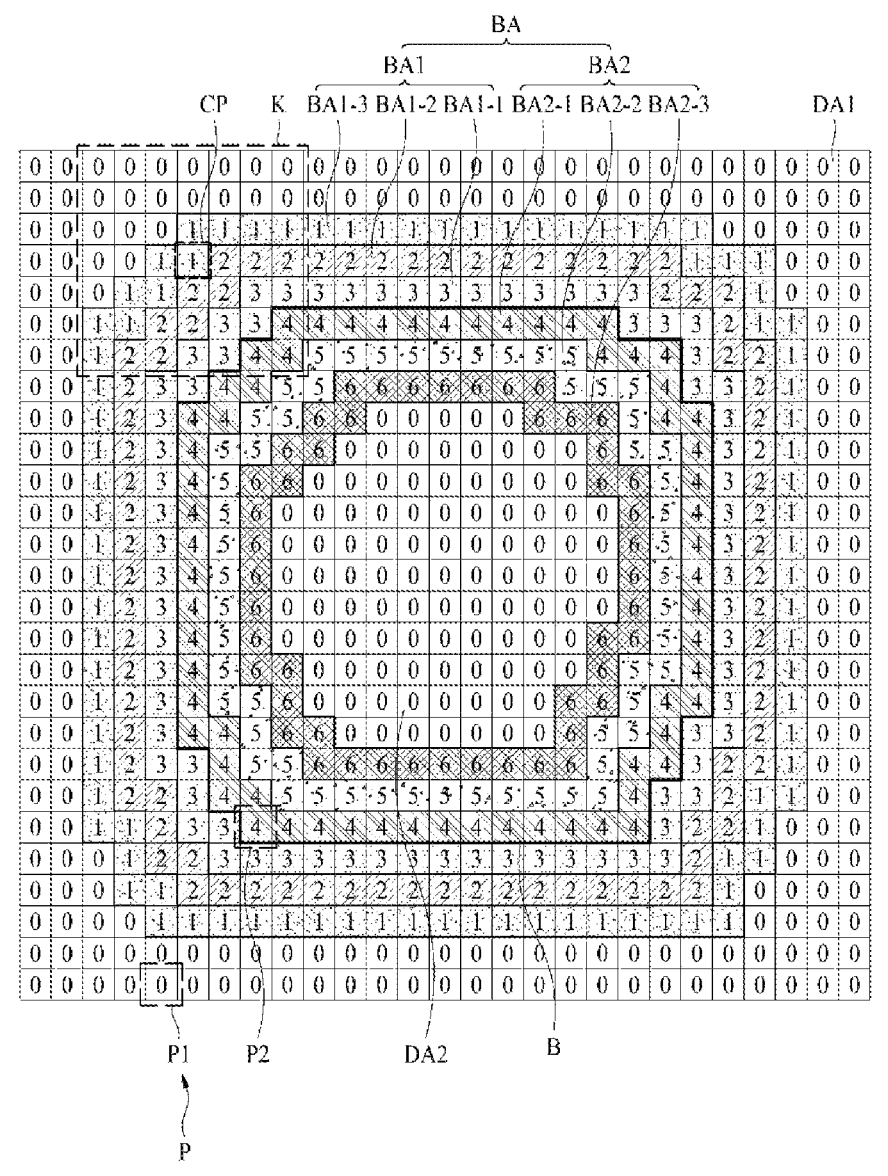
Figures 12, 13:
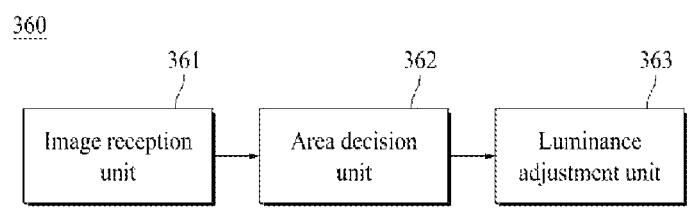
FIG. 12 is a view showing an example of a kernel.
FIG. 13 is a view showing an example of the construction of an image processing unit of FIG. 4.

FIG. 4 is a view showing the construction of the memory and the controller. FIG. 5A is a view illustrating a starting point and vertical length and direction information of the second display area when the second display area has a U shape, FIG. 5B is a view illustrating a starting point and vertical length and direction information of the second display area when the second display area has a circular shape, and FIG. 6 is a view illustrating left border information and right border information. FIG. 7 is a view showing an example of a second display area having a U shape, and FIG. 8 is a view showing an example of the shape information of the second display area shown in FIG. 7. FIG. 9 is a view illustrating a border pixel, and FIG. 10 is a view showing an example of display area information of each of a plurality of subpixels. FIG. 11 is a view showing an example of a border area and border information of each of a plurality of pixels, and FIG. 12 is a view showing an example of a kernel.

Referring to FIGS. 4 to 12, the memory 160 stores shape information of the second display area DA2. The controller 150 changes an image that is displayed in at least one of the first display area DA1 and the second display area DA2 of the display panel 110 using the shape information of the second display area DA2 stored in the memory 160.

The shape information of the second display area DA2 may include position information of a starting point, vertical length information of the second display area DA2, left border information about a left border located at the left side based on a central axis C of the second display area DA2, and right border information about a right border located at the right side based on the central axis C of the second display area DA2.

The position information of the starting point may include X-axis and Y-axis coordinate values at a certain point of the border of the second display area DA2. One or more starting points may be included depending on the shape of the second display area DA2.

As an example, as shown in FIG. 5A, the second display area DA2 may have a U shape. In the case in which the second display area DA2 has a U shape, a plurality of starting points may be provided. The starting points may include a first starting point S1 located at the left side of the central axis C and a second starting point S2 located at the right side of the central axis C.

Position information of the first starting point S1 may include an X-axis value notch_s1x of the first starting point S1 and a Y-axis value notch_sy of the first starting point S1. Position information of the second starting point S2 may include an X-axis value notch_s2x of the second starting point S2 and a Y-axis value notch_sy of the second starting point S2. The Y-axis values of the first starting point S1 and the second starting point S2 may be identical to each other, and the X-axis values of the first starting point S1 and the second starting point S2 may be different from each other. However, the present disclosure is not limited thereto. Both the Y-axis values and the X-axis values of the first starting point S1 and the second starting point S2 may be different from each other.

As another example, as shown in FIG. 5B, the second display area DA2 may have a circular shape. In the case in which the second display area DA2 has a circular shape, a single starting point may be provided. The starting point may include a third starting point S3 located at the central axis C. Position information of the third starting point S3 may include an X-axis value circle_sx of the third starting point S3 and a Y-axis value circle_sy of the third starting point S3.

The vertical length information of the second display area DA2 may include the vertical length of the shape of the second display area DA2. The vertical length of the shape of the second display area DA2 may correspond to the difference between the smallest Y-axis value and the largest Y-axis value, among coordinate values of a plurality of points constituting the border of the second display area DA2. At this time, the y-axis value of the starting point may be the smallest Y-axis value or the largest Y-axis value.

As an example, in the case in which the second display area DA2 has a U shape, as shown in FIG. 5A, the vertical length information of the second display area DA2 may include the largest value notch_hei, among vertical lengths between the plurality of points constituting the border of the second display area DA2 and the first starting point S1.

As another example, in the case in which the second display area DA2 has a circular shape, as shown in FIG. 5B, the vertical length information of the second display area DA2 may include the largest value circle_hei, among vertical lengths between the plurality of points constituting the border of the second display area DA2 and the third starting point S3.

The left border information, which is information about the left border located at the left side based on the central axis C of the second display area DA2, includes direction information and width information of each of a plurality of lines disposed within the vertical length from the starting point.

The left border information may include direction information and width information of each of a first line, at which the starting point is located, to an n-th line. At this time, n may correspond to the vertical length of the second display area DA2. For example, the vertical length of the second display area DA2 may be 20, in which case the left border information may include direction information and width information of each of 20 lines from a first line, at which the starting point is located, to a 20-th line.

The direction information included in the left border information may indicate a direction in which the left border located at the left side based on the central axis C of the second display area DA2 moves from the first line to the n-th line.

Specifically, in the case in which the distance between the central axis C and a left border provided at a previous line is equal to or less than the distance between the central axis C and a left border provided at a relevant line, the direction information included in the left border information may have a first direction value. That is, in the case in which the left border is parallel to or becomes distant from the central axis C, the direction information included in the left border information may have a first direction value.

For example, in the case in which the left border is parallel to the central axis C, as shown in FIG. 5A, the direction information included in the left border information may have a first direction value of 0. Alternatively, in the case in which the left border becomes distant from the central axis C, as shown in FIG. 5B, the direction information included in the left border information may have a first direction value of 0.

In the case in which the distance between the central axis C and the left border provided at the previous line is greater than the distance between the central axis C and the left border provided at the relevant line, the direction information included in the left border information may have a second direction value. That is, in the case in which the left border becomes close to the central axis C, the direction information included in the left border information may have a second direction value.

For example, in the case in which the left border becomes close to the central axis C, as shown in FIGS. 5A and 5B, the direction information included in the left border information may have a second direction value of 1.

The width information included in the left border information may include the width of the left border at each of the first line to the n-th line. At this time, the width may correspond to the number of pixels or subpixels provided in a relevant line. The width of the left border at each of the first line to the n-th line may be sequentially stored as the width information included in the left border information.

The right border information, which is information about the right border located at the right side based on the central axis C of the second display area DA2, includes direction information and width information of each of a plurality of lines disposed within the vertical length from the starting point.

The right border information may include direction information and width information of each of a first line, at which the starting point is located, to an n-th line. At this time, n may correspond to the vertical length of the second display area DA2.

The direction information included in the right border information may indicate a direction in which the right border located at the right side based on the central axis C of the second display area DA2 moves from the first line to the n-th line.

Specifically, in the case in which the distance between the central axis C and a right border provided at a previous line is equal to or less than the distance between the central axis C and a right border provided at a relevant line, the direction information included in the right border information may have a first direction value. That is, in the case in which the right border is parallel to or becomes distant from the central axis C, the direction information included in the right border information may have a first direction value.

For example, in the case in which the right border is parallel to the central axis C, as shown in FIG. 5A, the direction information included in the right border information may have a first direction value of 0. Alternatively, in the case in which the right border becomes distant from the central axis C, as shown in FIG. 5B, the direction information included in the right border information may have a first direction value of 0.

In the case in which the distance between the central axis C and the right border provided at the previous line is greater than the distance between the central axis C and the right border provided at the relevant line, the direction information included in the right border information may have a second direction value. That is, in the case in which the right border becomes close to the central axis C, the direction information included in the right border information may have a second direction value.

For example, in the case in which the right border becomes close to the central axis C, as shown in FIGS. 5A and 5B, the direction information included in the right border information may have a second direction value of 1.

The width information included in the right border information may include the width of the right border at each of the first line to the n-th line. At this time, the width may correspond to the number of pixels or subpixels provided in a relevant line. The width of the right border at each of the first line to the n-th line may be sequentially stored as the width information included in the right border information.

FIGS. 5A and 5B illustrate that the first direction value is 0 and the second direction value is 1. However, the present disclosure is not limited thereto. In another embodiment, the first direction value may be 1 and the second direction value may be 0.

The left border information and the right border information, described above, may be stored in the memory 160 while having a structure shown in FIG. 6. For example, the left border information and the right border information of each of six lines may be stored in 8 bytes.

Direction information of each of three successive lines may be stored in 1 byte. For example, in 1 byte, among 8 bytes, direction information line1 ld of the left border at a first line, direction information line1 rd of the right border at the first line, direction information line2 ld of the left border at a second line, direction information line2 rd of the right border at the second line, direction information line3 ld of the left border at a third line, and direction information line3 rd of the right border at the third line may be sequentially stored in 1 bit each.

Width information of each of three successive lines may be stored in 3 bytes. For example, in 3 bytes, among 8 bytes, width information of the left border at the first line, width information of the right border at the first line, width information of the left border at the second line, width information of the right border at the second line, width information of the left border at the third line, and width information of the right border at the third line may be sequentially stored in 4 bits each.

Direction information of each of three lines following the previously stored lines may be stored in 1 byte. For example, in 1 byte, among 8 bytes, direction information line4 ld of the left border at a fourth line, direction information line4 rd of the right border at the fourth line, direction information line5 ld of the left border at a fifth line, direction information line5 rd of the right border at the fifth line, direction information line6 ld of the left border at a sixth line, and direction information line6 rd of the right border at the sixth line may be stored in 1 bit each.

Width information of each of three lines following the previously stored lines may be stored in 3 bytes. For example, in 3 bytes, among 8 bytes, width information of the left border at the fourth line, width information of the right border at the fourth line, width information of the left border at the fifth line, width information of the right border at the fifth line, width information of the left border at the sixth line, and width information of the right border at the sixth line may be stored in 4 bits each.

Hereinafter, concrete examples of the left border information and the right border information will be described with reference to FIGS. 7 and 8.

The second display area DA2 may have a U shape, as shown in FIG. 7. In this case, starting points may include a first starting point S1 located at the left side of the central axis C and a second starting point S2 located at the right side of the central axis C.

Shape information of the second display area DA2 shown in FIG. 7 may include direction information and width information of each of a first line, at which the starting points S1 and S2 are located, to an n-th line.

Since the left border at the first line line1, at which the starting points S1 and S2 are located, becomes close to the central axis C, the direction information of the left border at the first line line1 may have a second direction value of, for example, 1. In addition, since the right border at the first line line1 becomes close to the central axis C, the direction information of the right border at the first line line1 may have a second direction value of, for example, 1.

The width information of the left border at the first line line1 may indicate the horizontal distance between the leftmost border pixel of the first line line1 and the leftmost border pixel of a second line line2, which is located next thereto. Since the horizontal distance between the leftmost border pixel of the first line line1 and the leftmost border pixel of the second line line2 corresponds to six pixels, the width information of the left border at the first line line1 may be 6.

The width information of the right border at the first line line1 may indicate the horizontal distance between the rightmost border pixel of the first line line1 and the rightmost border pixel of the second line line2, which is located next thereto. Since the horizontal distance between the rightmost border pixel of the first line line1 and the rightmost border pixel of the second line line2 corresponds to five pixels, the width information of the right border at the first line line1 may be 5.

It can be seen based on the width information and the direction information of the first line line1 that the leftmost border pixel of the second line line2 is disposed at the position of the second line line2 moved from the leftmost border pixel of the first line line1 to the central axis C by six pixels. In addition, it can be seen that the rightmost border pixel of the second line line2 is disposed at the position of the second line line2 moved from the rightmost border pixel of the first line line1 to the central axis C by five pixels.

Since the left border at the second line line2 becomes close to the central axis C, the direction information of the left border at the second line line2 may have a second direction value of, for example, 1. In addition, since the right border at the second line line2 becomes close to the central axis C, the direction information of the right border at the second line line2 may have a second direction value of, for example, 1.

The width information of the left border at the second line line2 may indicate the horizontal distance between the leftmost border pixel of the second line line2 and the leftmost border pixel of a third line line3, which is located next thereto. Since the horizontal distance between the leftmost border pixel of the second line line2 and the leftmost border pixel of the third line line3 corresponds to four pixels, the width information of the left border at the second line line2 may be 4.

The width information of the right border at the second line line2 may indicate the horizontal distance between the rightmost border pixel of the second line line2 and the rightmost border pixel of the third line line3, which is located next thereto. Since the horizontal distance between the rightmost border pixel of the second line line2 and the rightmost border pixel of the third line line3 corresponds to three pixels, the width information of the right border at the second line line2 may be 3.

It can be seen based on the width information and the direction information of the second line line2 that the leftmost border pixel of the third line line3 is disposed at the position of the third line line3 moved from the leftmost border pixel of the second line line2 to the central axis C by four pixels. In addition, it can be seen that the rightmost border pixel of the third line line3 is disposed at the position of the third line line3 moved from the rightmost border pixel of the second line line2 to the central axis C by three pixels.

The direction information and the width information of each of the third line line3 to a sixth line line6 may be set in the same manner as the direction information and the width information described above. In an embodiment, in the case in which the distance between a border at a relevant line and the central axis C is equal to the distance between a border at a next line and the central axis C, the width information may be set to 0. For example, as shown in FIG. 7, the distance between the leftmost border pixel of the sixth line line6 and the central axis C may be equal to the distance between the leftmost border pixel of the seventh line line7 and the central axis C. In this case, the width information of the left border at the sixth line line6 may be set to 0, since the horizontal distance between the leftmost border pixel of the seventh line line7 and the leftmost border pixel of the sixth line line6 is 0.

The display device 100 according to the embodiment of the present disclosure may sequentially store the direction information and the width information of each of the first line to the n-th line in the memory 160 in the order of line.

The display device 100 according to the embodiment of the present disclosure is capable of easily acquiring the border of the second display area based only on the position information of the starting point and the vertical length information, the line-based direction information, and the width information of the second display area, since the direction information and the width information of each of the first line to the n-th line are sequentially stored in the order of line.

Consequently, the display device 100 according to the embodiment of the present disclosure is capable of minimizing the amount of information stored in the memory 160, whereby a small-capacity memory 160 may be used. In addition, the display device 100 according to the embodiment of the present disclosure is capable of acquiring the border of the second display area DA2 through simple calculation, whereby computational load is low in processing for individually controlling the first display area DA1 and the second display area DA2.

Also, in the display device 100 according to the embodiment of the present disclosure, it is sufficient to change only the shape information of the second display area DA2 stored in the memory 160, whereby it is possible to easily change the shape of the second display area DA2.

Referring back to FIG. 4, the controller 150 generates display area information and border information using the shape information of the second display area DA2 stored in the memory 160. The controller 150 may correct an image that is displayed in at least one of the first display area DA1 and the second display area DA2 of the display panel 110 using the display area information and the border information, and may perform control such that the corrected image is displayed on the display panel 110.

To this end, the controller 150 may include a line counting unit 310, a border pixel extraction unit 330, a display area information generation unit 340, a border information generation unit 350, an image processing unit 360, and a control unit 370.

The line counting unit 310 may count a line value from the first line of the display panel 110 in which the plurality of pixels P is provided one by one, and may provide the counted line value to the border pixel extraction unit 330. The line counting unit 310 may determine whether the counted line value corresponds to the first line, at which the starting point is disposed, using the position information of the starting point stored in the memory 160. Upon the line counting unit 310 determining that the counted line value corresponds to the first line, at which the starting point is disposed, the border pixel extraction unit 330 may retrieve the shape information of the second display area DA2 from the memory 160.

The border pixel extraction unit 330 may extract the leftmost border pixel and the rightmost border pixel from a relevant line using the position information of the starting point, the line-based direction information, and the width information stored in the memory 160. Here, the relevant line may be a line corresponding to the line value provided by the line counting unit 310. The leftmost border pixel may be a pixel disposed at the leftmost side of the relevant line, among the second pixels P2 provided in the second display area DA2. The rightmost border pixel may be a pixel disposed at the rightmost side of the relevant line, among the second pixels P2 provided in the second display area DA2.

The border pixel extraction unit 330 may extract the leftmost border pixel and the rightmost border pixel of each of the first line, at which the starting point is disposed, to the n-th line in the order of line. The border pixel extraction unit 330 may extract the leftmost border pixel and the rightmost border pixel of a relevant line using the leftmost border pixel and the rightmost border pixel of a previous line, direction information of the previous line, and width information of the previous line.

Specifically, the line value corresponding to the first line, at which the starting point is located, from the line counting unit 310 may be input to the border pixel extraction unit 330. As shown in FIG. 9, the border pixel extraction unit 330 may extract the leftmost border pixel BP1 and the rightmost border pixel BP2 of the first line using the position information of the starting point.

At this time, in the case in which the second display area DA2 has a U shape, the pixel disposed at the position corresponding to the first starting point S1 may be the leftmost border pixel BP1, and the pixel disposed at the position corresponding to the second starting point S2 may be the rightmost border pixel BP2. Meanwhile, in the case in which the second display area DA2 has a circular shape, unlike what is shown in FIG. 9, the pixel disposed at the position corresponding to the starting point may be the leftmost border pixel BP1 and the rightmost border pixel BP2.

The line value corresponding to the second line, which is disposed next to the first line, from the line counting unit 310 may be input to the border pixel extraction unit 330. The border pixel extraction unit 330 may extract the leftmost border pixel BP3 and the rightmost border pixel BP4 of the second line using the leftmost border pixel BP1 and the rightmost border pixel BP2 of the first line, direction information of the first line, and width information of the first line.

In the case in which the direction information of the left border of the first line has a first direction value, the leftmost border pixel BP3 of the second line may be a pixel disposed at the position of the second line moved from the leftmost border pixel BP1 of the first line in the direction opposite the central axis C by the number corresponding to the width information of the left border of the first line. The Y-axis value of the leftmost border pixel BP3 of the second line may have a value higher by 1 than the Y-axis value of the leftmost border pixel BP1 of the first line, and the X-axis value of the leftmost border pixel BP3 of the second line may have a value obtained by subtracting the value corresponding to the width information of the left border of the first line from the X-axis value of the leftmost border pixel BP1 of the first line.

In the case in which the direction information of the left border of the first line has a second direction value, the leftmost border pixel BP3 of the second line may be a pixel disposed at the position of the second line moved from the leftmost border pixel BP1 of the first line toward the central axis C by the number corresponding to the width information of the left border of the first line. The Y-axis value of the leftmost border pixel BP3 of the second line may have a value higher by 1 than the Y-axis value of the leftmost border pixel BP1 of the first line, and the X-axis value of the leftmost border pixel BP3 of the second line may have a value obtained by adding the value corresponding to the width information of the left border of the first line to the X-axis value of the leftmost border pixel BP1 of the first line.

Also, in the case in which the direction information of the right border of the first line has a first direction value, the rightmost border pixel BP4 of the second line may be a pixel disposed at the position of the second line moved from the rightmost border pixel BP2 of the first line in the direction opposite the central axis C by the number corresponding to the width information of the right border of the first line. The Y-axis value of the rightmost border pixel BP4 of the second line may have a value higher by 1 than the Y-axis value of the rightmost border pixel BP2 of the first line, and the X-axis value of the rightmost border pixel BP4 of the second line may have a value obtained by adding the value corresponding to the width information of the right border of the first line to the X-axis value of the rightmost border pixel BP2 of the first line. In the case in which the direction information of the right border of the first line has a second direction value, the rightmost border pixel BP4 of the second line may be a pixel disposed at the position of the second line moved from the rightmost border pixel BP2 of the first line toward the central axis C by the number corresponding to the width information of the right border of the first line. The Y-axis value of the rightmost border pixel BP4 of the second line may have a value higher by 1 than the Y-axis value of the rightmost border pixel BP2 of the first line, and the X-axis value of the rightmost border pixel BP4 of the second line may have a value obtained by subtracting the value corresponding to the width information of the right border of the first line from the X-axis value of the rightmost border pixel BP2 of the first line.

As described above, the border pixel extraction unit 330 may extract the leftmost border pixel and the rightmost border pixel of each of the first line to the n-th line.

The display area information generation unit 340 may generate display area information of each of the plurality of pixels P using the leftmost border pixel and the rightmost border pixel of each line.

The display area information generation unit 340 may decide the leftmost border pixel, the rightmost border pixel, and pixels provided between the leftmost border pixel and the rightmost border pixel, among pixels provided in a relevant line, as second pixels P2 provided in the second display area DA2. The display area information generation unit 340 may decide pixels other than the leftmost border pixel, the rightmost border pixel, and the pixels provided between the leftmost border pixel and the rightmost border pixel, among the pixels provided in the relevant line, as first pixels P1 provided in the first display area DA1.

The display area information generation unit 340 may set display area information of each of the first subpixels SP1 included in the first pixels P1 to a first display area value. For example, the first display area value may be 0, as shown in FIG. 10.

The display area information generation unit 340 may set display area information of each of the second subpixels SP2 included in the second pixels P2 to a second display area value or a third display area value. The display area information generation unit 340 may generates display area information in the state of dividing the second pixels P2 provided in the second display area DA2 into light-emitting pixels and non-light-emitting pixels.

In the case in which the second pixels P2 are light-emitting pixels, the display area information generation unit 340 may set display area information of each of the second subpixels SP2 included in the light-emitting pixels to a second display area value. For example, the second display area value may be 1, as shown in FIG. 10.

Meanwhile, in the case in which the second pixels P2 are non-light-emitting pixels, the display area information generation unit 340 may set display area information of each of the second subpixels SP2 included in the non-light-emitting pixels to a third display area value. For example, the third display area value may be 2, as shown in FIG. 10.

FIG. 10 illustrates that the second display area DA2 is divided into light-emitting pixels and non-light-emitting pixels in pixel units. However, the present disclosure is not limited thereto. The second display area DA2 may be divided into light-emitting subpixels and non-light-emitting subpixels in subpixel units. Specifically, a plurality of second subpixels SP2 included in one second pixel P2 may all be light-emitting subpixels or non-light-emitting subpixels. Alternatively, some of a plurality of second subpixels SP2 included in one second pixel P2 may be light-emitting subpixels, and the others may be non-light-emitting subpixels.

The border information generation unit 350 may generate border information of pixels provided in a border area BA located within a predetermined range from the border B between the first display area DA1 and the second display area DA2 using the leftmost border pixel and the rightmost border pixel of each line.

As shown in FIG. 11, the border area BA may include a plurality of first border areas BA1 disposed in the first display area DA1. For example, the first border areas BA1 may include a 1-1 border area BA1-1 disposed in the first display area DA1 so as to be adjacent to the border B, a 1-2 border area BA1-2 disposed in the first display area DA1 so as to be adjacent to the 1-1 border area BA1-1, and a 1-3 border area BA1-3 disposed in the first display area DA1 so as to be adjacent to the 1-2 border area BA1-2. At this time, the distance between the 1-2 border area BA1-2 and the border B may be greater than the distance between the 1-1 border area BA1-1 and the border B, and the distance between the 1-3 border area BA1-3 and the border B may be greater than the distance between the 1-2 border area BA1-2 and the border B.

FIG. 11 shows that the first display area DA1 includes three border areas BA1-1, BA1-2, and BA1-3. However, the present disclosure is not limited thereto. The first display area DA1 may include two border areas, or may include one border area. Alternatively, the first display area DA1 may include four or more border areas.

As shown in FIG. 11, the border area BA may include a plurality of second border areas BA2 disposed in the second display area DA2. For example, the second border areas BA2 may include a 2-1 border area BA2-1 disposed in the second display area DA2 so as to be adjacent to the border B, a 2-2 border area BA2-2 disposed in the second display area DA2 so as to be adjacent to the 2-1 border area BA2-1, and a 2-3 border area BA2-3 disposed in the second display area DA2 so as to be adjacent to the 2-2 border area BA2-2. At this time, the distance between the 2-2 border area BA2-2 and the border B may be greater than the distance between the 2-1 border area BA2-1 and the border B, and the distance between the 2-3 border area BA2-3 and the border B may be greater than the distance between the 2-2 border area BA2-2 and the border B.

FIG. 11 shows that the second display area DA2 includes three border areas BA2-1, BA2-2, and BA2-3. However, the present disclosure is not limited thereto. The second display area DA2 may include two border areas, or may include one border area. Alternatively, the second display area DA2 may include four or more border areas.

The border information generation unit 350 may generate border information of each of the pixels provided in the border area BA using a kernel K consisting of m rows and m columns (m being a natural number greater than 2). Hereinafter, the kernel K will be described as consisting of seven rows and seven columns, as shown in FIGS. 11 and 12, for convenience of description. However, the present disclosure is not limited thereto. The size of the kernel K may be changed.

Referring to FIGS. 11 and 12, the border information generation unit 350 may dispose each of the plurality of pixels P at the center of the kernel K. The border information generation unit 350 may decide a border value of the pixel CP disposed at the center of the kernel K based on the positions in the kernel K at which a border pixel is disposed. Here, the border pixel, which is a pixel disposed in the second display area DA2 so as to be adjacent to the first display area DA1, may include the leftmost border pixel and the rightmost border pixel of each line. In addition, the border pixel may include pixels provided between the leftmost border pixel and the rightmost border pixel of each of the first line to the n-th line.

The border information generation unit 350 may dispose the pixel CP in a central area of the kernel K, and may confirm the position in the kernel K at which the border pixel is disposed.

In the case in which the kernel K consists of seven rows and seven columns, the kernel K may include a central area (0, 0) and eight first areas (−1, −1), (0, −1), (1, −1), (1, 0), (1, 1), (0, 1), (−1, 1), and (−1, 0) disposed adjacent to the central area so as to surround the central area. In addition, the kernel K may include 16 second areas (−2, −2), (−1, −2), (0, −2), (1, −2), (2, −2), (2, −1), (2, 0), (2, 1), (2, 2), (1, 2), (0, 2), (−1, 2), (−2, 2), (−2, 1), (−2, 0), and (−2, −1) disposed adjacent to the first areas so as to surround the first areas. In addition, the kernel K may include 24 third areas (−3, −3), (−2, −3), (−1, −3), (0, −3), (1, −3), (2, −3), (2, −3), (3, −3), (3, −2), (3, −1), (3, 0), (3, 1), (3, 2), (3, 3), (2, 3), (1, 3), (0, 3), (−1, 3), (−2, 3), (−3, 3), (−3, 2), (−3, 1), (−3, 0), (−3, −1), and (−3, −2) disposed adjacent to the second areas so as to surround the second areas.

The border information generation unit 350 may determine whether the pixel CP disposed in the central area of the kernel K is a first pixel P1 disposed in the first display area DA1 or a second pixel P2 disposed in the second display area DA2. In the case in which the pixel CP disposed in the central area of the kernel K is a first pixel P1 and the border pixel is disposed in any one of the 24 third areas of the kernel K, the border information generation unit 350 may set a first border value for the pixel CP disposed in the central area of the kernel K. For example, the first border value may be 1.

The border information generation unit 350 may set border information of each of the first pixels P1 provided in the 1-3 border area BA1-3 so as to have a first border value of, for example, 1, as shown in FIG. 11.

In the case in which the pixel CP disposed in the central area of the kernel K is a first pixel P1 and the border pixel is disposed in any one of the 16 second areas of the kernel K, the border information generation unit 350 may set a second border value for the pixel CP disposed in the central area of the kernel K. For example, the second border value may be 2.

The border information generation unit 350 may set border information of each of the first pixels P1 provided in the 1-2 border area BA1-2 so as to have a second border value of, for example, 2, as shown in FIG. 11.

In the case in which the pixel CP disposed in the central area of the kernel K is a first pixel P1 and the border pixel is disposed in any one of the eight first areas of the kernel K, the border information generation unit 350 may set a third border value for the pixel CP disposed in the central area of the kernel K. For example, the third border value may be 3.

The border information generation unit 350 may set border information of each of the first pixels P1 provided in the 1-1 border area BA1-1 so as to have a third border value of, for example, 3, as shown in FIG. 11.

Meanwhile, in the case in which the pixel CP disposed in the central area of the kernel K is a second pixel P2 and the border pixel is disposed in any one of the eight first areas of the kernel K, the border information generation unit 350 may set a fourth border value for the pixel CP disposed in the central area of the kernel K. For example, the fourth border value may be 4.

The border information generation unit 350 may set border information of each of the second pixels P2 provided in the 2-1 border area BA2-1 so as to have a fourth border value of, for example, 4, as shown in FIG. 11.

In the case in which the pixel CP disposed in the central area of the kernel K is a second pixel P2 and the border pixel is disposed in any one of the 16 second areas of the kernel K, the border information generation unit 350 may set a fifth border value for the pixel CP disposed in the central area of the kernel K. For example, the fifth border value may be 5.

The border information generation unit 350 may set border information of each of the second pixels P2 provided in the 2-2 border area BA2-2 so as to have a fifth border value of, for example, 5, as shown in FIG. 11.

In the case in which the pixel CP disposed in the central area of the kernel K is a second pixel P2 and the border pixel is disposed in any one of the 24 third areas of the kernel K, the border information generation unit 350 may set a sixth border value for the pixel CP disposed in the central area of the kernel K. For example, the sixth border value may be 6.

The border information generation unit 350 may set border information of each of the second pixels P2 provided in the 2-3 border area BA2-3 so as to have a sixth border value of, for example, 6, as shown in FIG. 11.

As a result, each of the pixels P provided in the border area BA may have a border value that increases or decreases with increasing distance from the border pixel. In an embodiment, each of the first pixels P1 provided in the first display area DA1, among the pixels P provided in the border area BA, may have a border value that decreases with increasing distance from the border pixel. Each of the second pixels P2 provided in the second display area DA2, among the pixels P provided in the border area BA, may have a border value that increases with increasing distance from the border pixel.

Meanwhile, each of the first pixels P1 and the second pixels P2 provided in the area other than the border area may be set to a seventh border value. For example, the seventh border value may be 0.

The image processing unit 360 changes an image that is displayed on the display panel 110 using the display area information generated by the display area information generation unit 340 and the border information generated by the border information generation unit 350. The image processing unit 360 may change an image that is displayed in the border area BA, and may perform control such that the corrected image is displayed on the display panel 110.

Hereinafter, an example of the image processing unit 360 will be described in more detail with reference to FIGS. 13 to 15.

Figure 14:
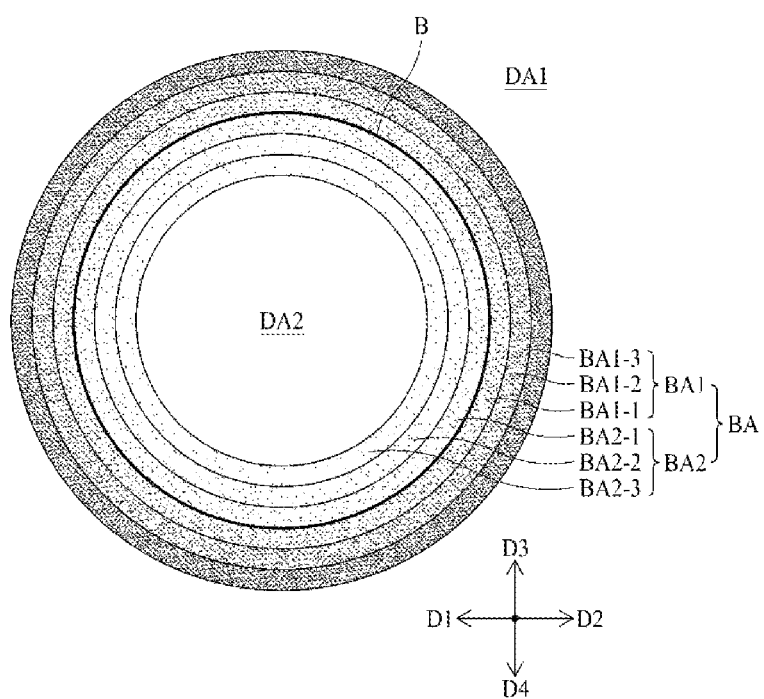
FIG. 14 is a view showing an example in which luminance of an image is adjusted by the image processing unit.
Figure 15:
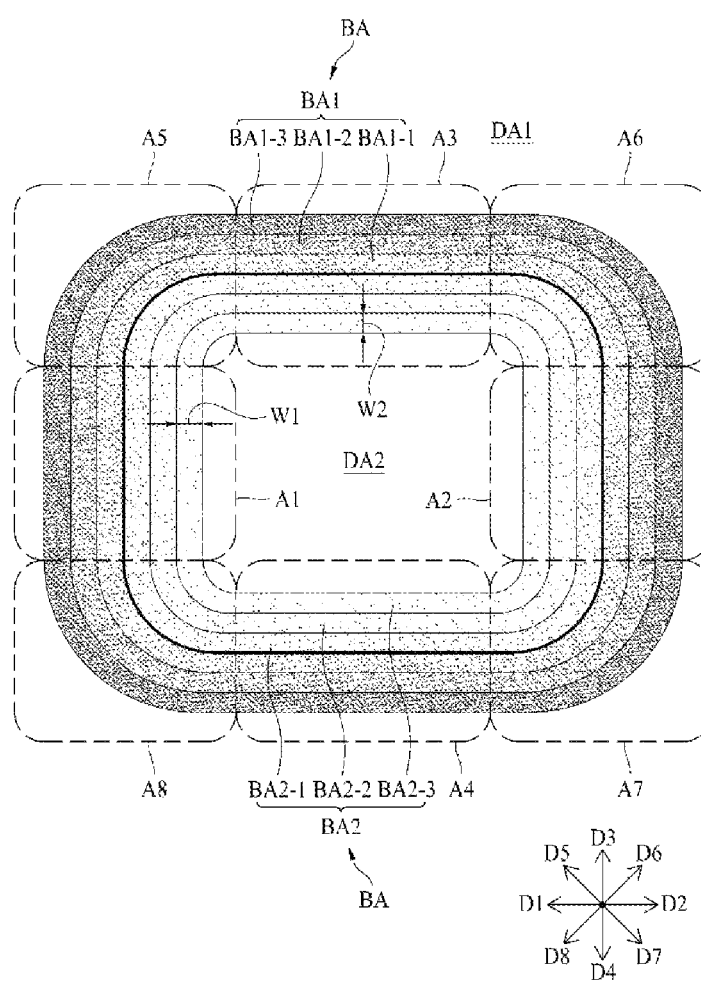
FIG. 15 is a view showing another example in which luminance of an image is adjusted by the image processing unit.

FIG. 13 is a view showing an example of the construction of the image processing unit of FIG. 4, FIG. 14 is a view showing an example in which luminance of an image is adjusted by the image processing unit, and FIG. 15 is a view showing another example in which luminance of an image is adjusted by the image processing unit.

Referring to FIGS. 13 to 15, the image processing unit 360 may include an image reception unit 361, an area decision unit 362, and a luminance adjustment unit 363.

The image reception unit 361 receives image data from an external system. At this time, the received image data may include image data of the first display area DA1 and the second display area DA2.

The area decision unit 362 decides image data of the border area BA among the received image data. Specifically, the area decision unit 362 may decide image data of the border area BA among the received image data based on the border information generated by the border information generation unit 350.

The area decision unit 362 may decide image data of pixels P, the border information of each of which has a value corresponding to the border area BA, as image data of the border area BA. For example, the area decision unit 362 may decide image data of pixels P, the border information of each of which has a border value greater than 0, as image data of the border area BA.

The area decision unit 362 may decide image data of each of a plurality of border areas BA among the received image data. The border area BA may include a first border area BA1 disposed in the first display area DA1 so as to be adjacent to the border B and a second border area BA2 disposed in the second display area DA2 so as to be adjacent to the border B.

The area decision unit 362 may decide image data of each of the first border area BA1 and the second border area BA2. The area decision unit 362 may decide image data of first pixels P1, the border information of each of which has a value corresponding to the first border area BA1, as image data of the first border area BA1. The area decision unit 362 may decide image data of second pixels P2, the border information of each of which has a value corresponding to the second border area BA2, as image data of the second border area BA2.

In addition, a plurality of first border areas BA1 may be provided. For example, the first border area BA1 may include a 1-1 border area BA1-1 disposed in the first display area DA1 so as to be adjacent to the border B, a 1-2 border area BA1-2 disposed in the first display area DA1 so as to be adjacent to the 1-1 border area BA1-1, and a 1-3 border area BA1-3 disposed in the first display area DA1 so as to be adjacent to the 1-2 border area BA1-2.

The area decision unit 362 may decide image data of each of the plurality of first border areas BA1-1, BA1-2, and BA1-3. The area decision unit 362 may decide image data of first pixels P1, the border information of each of which has a value corresponding to the 1-1 border area BA1-1, as image data of the 1-1 border area BA1-1. For example, the area decision unit 362 may decide image data of first pixels P1, the border information of each of which has a third border value, as image data of the 1-1 border area BA1-1.

The area decision unit 362 may decide image data of first pixels P1, the border information of each of which has a value corresponding to the 1-2 border area BA1-2, as image data of the 1-2 border area BA1-2. For example, the area decision unit 362 may decide image data of first pixels P1, the border information of each of which has a second border value, as image data of the 1-2 border area BA1-2.

The area decision unit 362 may decide image data of first pixels P1, the border information of each of which has a value corresponding to the 1-3 border area BA1-3, as image data of the 1-3 border area BA1-3. For example, the area decision unit 362 may decide image data of first pixels P1, the border information of each of which has a first border value, as image data of the 1-3 border area BA1-3.

In addition, a plurality of second border areas BA2 may be provided. For example, the second border area BA2 may include a 2-1 border area BA2-1 disposed in the second display area DA2 so as to be adjacent to the border B, a 2-2 border area BA2-2 disposed in the second display area DA2 so as to be adjacent to the 2-1 border area BA2-1, and a 2-3 border area BA2-3 disposed in the second display area DA2 so as to be adjacent to the 2-2 border area BA2-2.

The area decision unit 362 may decide image data of each of the plurality of second border areas BA2-1, BA2-2, and BA2-3. The area decision unit 362 may decide image data of second pixels P2, the border information of each of which has a value corresponding to the 2-1 border area BA2-1, as image data of the 2-1 border area BA2-1. For example, the area decision unit 362 may decide image data of second pixels P2, the border information of each of which has a fourth border value, as image data of the 2-1 border area BA2-1.

The area decision unit 362 may decide image data of second pixels P2, the border information of each of which has a value corresponding to the 2-2 border area BA2-2, as image data of the 2-2 border area BA2-2. For example, the area decision unit 362 may decide image data of second pixels P2, the border information of each of which has a fifth border value, as image data of the 2-2 border area BA2-2.

The area decision unit 362 may decide image data of second pixels P2, the border information of each of which has a value corresponding to the 2-3 border area BA2-3, as image data of the 2-3 border area BA2-3. For example, the area decision unit 362 may decide image data of second pixels P2, the border information of each of which has a sixth border value, as image data of the 2-3 border area BA2-3.

Meanwhile, the area decision unit 362 may decide image data of the area other than the border area BA in the first display area DA1. The area decision unit 362 may decide image data of first pixels P1, the display area information of each of which has a value corresponding to the first display area DA1 and the border information of each of which is 0, as image data of the area other than the border area BA in the first display area DA1.

The area decision unit 362 may decide image data of the area other than the border area BA in the second display area DA2. The area decision unit 362 may decide image data of second pixels P2, the display area information of each of which has a value corresponding to the second display area DA2 and the border information of each of which is 0, as image data of the area other than the border area BA in the second display area DA2.

The luminance adjustment unit 363 adjusts the luminance of the received image data. Specifically, the luminance adjustment unit 363 may adjust the luminance of each of the area other than the border area BA in the first display area DA1, the border area BA, and the area other than the border area BA in the second display area DA2.

The luminance adjustment unit 363 may perform adjustment such that the luminance of image data of the border area BA has a value between the luminance of image data of the area other than the border area BA in the first display area DA1 and the luminance of image data of the area other than the border area BA in the second display area DA2.

The luminance adjustment unit 363 may perform adjustment such that image data of the area other than the border area BA in the first display area DA1 have first luminance. The luminance adjustment unit 363 may perform adjustment such that image data of the area other than the border area BA in the second display area DA2 have second luminance, which is different from the first luminance.

For example, the second luminance may be higher than the first luminance. Since the second display area DA2 includes non-light-emitting pixels or non-light-emitting subpixels, the resolution of the second display area DA2 is lower than the resolution of the first display area DA1. Consequently, image data applied to the second pixels P2 provided in the second display area DA2 may have higher luminance than image data applied to the first pixels P1 provided in the first display area DA1.

In the case in which the first display area DA1 and the second display area DA2 are different in luminance from each other, a lining phenomenon and color difference may occur at the border B between the first display area DA1 and the second display area DA2 due to the luminance difference between the first display area DA1 and the second display area DA2.

In the display device 100 according to the embodiment of the present disclosure, the luminance of the border area BA located within a predetermined range from the border B between the first display area DA1 and the second display area DA2 is adjusted, whereby it is possible to prevent the occurrence of a lining phenomenon and color difference at the border B between the first display area DA1 and the second display area DA2.

To this end, the luminance adjustment unit 363 may perform adjustment such that image data of the border area BA have third luminance, which is a value between the first luminance and the second luminance.

For example, in the case in which the second luminance is higher than the first luminance, the third luminance may be higher than the first luminance and may be lower than the second luminance.

The luminance adjustment unit 363 may adjust the luminance of image data of each of the first border area BA1 and the second border area BA2. Specifically, the luminance adjustment unit 363 may perform adjustment such that the luminance of image data of the first pixels P1 provided in the first border area BA1 and the luminance of image data of the second pixels P2 provided in the second border area BA2 are different from each other.

For example, in the case in which the second luminance is higher than the first luminance, the luminance adjustment unit 363 may perform adjustment such that the luminance of image data of the first pixels P1 provided in the first border area BA1 is lower than the luminance of image data of the second pixels P2 provided in the second border area BA2. Consequently, the luminance of an image displayed on the display panel 110 may gradually decrease in the direction from the second display area DA2 to the first display area DA1. In the display device 100 according to the embodiment of the present disclosure, luminance is not abruptly changed but is gradually changed between the second display area DA2 to the first display area DA1, whereby it is possible to prevent the occurrence of a lining phenomenon and color difference.

Meanwhile, in the case in which the plurality of first border areas BA1 is provided, the luminance adjustment unit 363 may adjust the luminance of image data of each of the plurality of first border areas BA1-1, BA1-2, and BA1-3. As shown in FIGS. 14 and 15, the luminance adjustment unit 363 may perform adjustment such that the luminance of image data of each of the plurality of first border areas BA1-1, BA1-2, and BA1-3 gradually increases or decreases with decreasing distance from the second display area DA2.

For example, in the case in which the second luminance is higher than the first luminance, the luminance adjustment unit 363 may perform adjustment such that the luminance of image data of each of the plurality of first border areas BA1-1, BA1-2, and BA1-3 gradually increases with decreasing distance from the second display area DA2.

Also, in the case in which the plurality of second border areas BA2 is provided, the luminance adjustment unit 363 may adjust the luminance of image data of each of the plurality of second border areas BA2-1, BA2-2, and BA2-3. As shown in FIGS. 14 and 15, the luminance adjustment unit 363 may perform adjustment such that the luminance of image data of each of the plurality of second border areas BA2-1, BA2-2, and BA2-3 gradually increases or decreases with decreasing distance from the first display area DA1.

For example, in the case in which the second luminance is higher than the first luminance, the luminance adjustment unit 363 may perform adjustment such that the luminance of image data of each of the plurality of second border areas BA2-1, BA2-2, and BA2-3 gradually decreases with decreasing distance from the first display area DA1.

In the display device 100 according to the embodiment of the present disclosure, adjustment is performed such that the luminance of each of the plurality of border areas BA gradually decreases or increases, whereby it is possible to minimize the luminance difference between the areas. Consequently, the display device 100 according to the embodiment of the present disclosure is capable of preventing a lining phenomenon that occurs between the first display area DA1 and the second display area DA2, which are different in resolution from each other, from being recognized by a user. In addition, the display device 100 according to the embodiment of the present disclosure is capable of preventing the occurrence of color difference between the first display area DA1 and the second display area DA2, which are different in resolution from each other.

The luminance adjustment unit 363 may independently adjust the luminance of each of the plurality of first border areas BA1 and the plurality of second border areas BA2.

Furthermore, the luminance adjustment unit 363 may perform adjustment such that luminance is changed depending on the direction in which the border area BA is disposed based on the central area of the second display area DA2. For example, the border area BA may include a left border area A1 disposed in the leftward direction D1 based on the central area of the second display area DA2, a right border area A2 disposed in the rightward direction D2 based on the central area of the second display area DA2, an upper border area A3 disposed in the upward direction D3 based on the central area of the second display area DA2, and a lower border area A4 disposed in the downward direction D4 based on the central area of the second display area DA2.

As shown in FIG. 15, the border area BA may further include a left upper border area A5 disposed in the left-upward direction D5 based on the central area of the second display area DA2, a right upper border area A6 disposed in the right-upward direction D6 based on the central area of the second display area DA2, a right lower border area A7 disposed in the right-downward direction D7 based on the central area of the second display area DA2, and a left lower border area A8 disposed in the left-downward direction D8 based on the central area of the second display area DA2.

Hereinafter, the border area BA will be described as including the left border area A1, the right border area A2, the upper border area A3, and the lower border area A4 for convenience of description. However, the present disclosure is not limited thereto.

The luminance adjustment unit 363 may independently adjust the luminance of image data of pixels P provided in each of the left border area A1, the right border area A2, the upper border area A3, and the lower border area A4.

Specifically, the luminance adjustment unit 363 may perform adjustment such that the luminance of image data of each of the left border area A1, the right border area A2, the upper border area A3, and the lower border area A4 has a value between the first luminance of image data of the area other than the border area BA in the first display area DA1 and the second luminance of image data of the area other than the border area BA in the second display area DA2.

The luminance adjustment unit 363 may perform adjustment such that image data of the left border area A1 have fourth luminance, which is a value between the first luminance and the second luminance. The luminance adjustment unit 363 may perform adjustment such that image data of the right border area A2 have fifth luminance, which is a value between the first luminance and the second luminance. The luminance adjustment unit 363 may perform adjustment such that image data of the upper border area A3 have sixth luminance, which is a value between the first luminance and the second luminance. The luminance adjustment unit 363 may perform adjustment such that image data of the lower border area A4 have seventh luminance, which is a value between the first luminance and the second luminance.

Although each of the fourth luminance, the fifth luminance, the sixth luminance, and the seventh luminance has a value between the first luminance and the second luminance, all may have different values, or some may have the same value while some may have different values. That is, the luminance adjustment unit 363 may independently adjust the luminance of image data of each of the left border area A1, the right border area A2, the upper border area A3, and the lower border area A4.

More specifically, a luminance change value of each of the left border area A1, the right border area A2, the upper border area A3, and the lower border area A4 may be preset. A first luminance change value may be set for the left border area A1, a second luminance change value may be set for the right border area A2, a third luminance change value may be set for the upper border area A3, and a fourth luminance change value may be set for the lower border area A4.

At this time, the first luminance change value, the second luminance change value, the third luminance change value, and the fourth luminance change value may be decided in consideration of the pitch between the pixels P. The first luminance change value may be decided based on the pitch between one pixel P and an adjacent pixel P disposed in the leftward direction D1. The second luminance change value may be decided based on the pitch between one pixel P and an adjacent pixel P disposed in the rightward direction D2. The third luminance change value may be decided based on the pitch between one pixel P and an adjacent pixel P disposed in the upward direction D3. The fourth luminance change value may be decided based on the pitch between one pixel P and an adjacent pixel P disposed in the downward direction D4.

For example, the luminance change value may be proportional to the pitch between the pixels P. In the case in which the pitch between the pixels P is large, the luminance change value may increase. In the case in which the pitch between the pixels P is small, on the other hand, the luminance change value may decrease.

The luminance adjustment unit 363 may adjust the luminance of image data of pixels P provided in a relevant border area BA by reflecting a luminance change value set for the relevant border area BA in the image data of the pixels P provided in the relevant border area BA.

Meanwhile, as shown in FIGS. 14 and 15, each of the left border area A1, the right border area A2, the upper border area A3, and the lower border area A4 may be divided into a plurality of border areas. For example, each of the left border area A1, the right border area A2, the upper border area A3, and the lower border area A4 may include a first border area BA1 disposed in the first display area DA1 so as to be adjacent to the border B and a second border area BA2 disposed in the second display area DA2 so as to be adjacent to the border B. At this time, a plurality of first border areas BA1 may be provided, and a plurality of second border areas BA2 may also be provided.

The luminance adjustment unit 363 may independently adjust the luminance of each of the plurality of first border areas BA1 and the plurality of second border areas BA2, as previously described. In this case, the luminance change value may include a plurality of values for the plurality of first border areas BA1 and the plurality of second border areas BA2.

For example, each of the left border area A1, the right border area A2, the upper border area A3, and the lower border area A4 may include three first border areas BA1 and three second border areas BA2. At this time, the first luminance change value for the left border area A1 may include values for the three first border areas BA1 and values for the three second border areas BA2, i.e. six luminance change values. As a result, the luminance adjustment unit 363 may set 24 luminance change values for the 24 border areas. The luminance adjustment unit 363 may adjust the luminance of image data of each of the 24 border areas using the set luminance change values.

The control unit 370 performs control such that the corrected image is displayed on the display panel 110. To this end, the control unit 370 may generate a control signal for controlling the panel driving unit 130. The control unit 370 may generate a data control signal for controlling the data driving unit of the panel driving unit 130 and a gate control signal for controlling the gate driving unit of the panel driving unit 130. The control unit 370 may output the data control signal, the gate control signal, and an image data signal to the panel driving unit 130.

The control unit 370 may control the operation of the optical module 120. To this end, the control unit 370 may generate a control signal for controlling the optical driving unit 140, and may output the generated control signal to the optical driving unit 140.

As is apparent from the above description, it is possible to display an image even in an area disposed so as to overlap a camera. In the present disclosure, therefore, it is possible to provide a wide image display surface and to prevent an image from being interrupted in an area in which the camera is disposed.

In addition, according to the present disclosure, it is possible to store shape information of the area disposed so as to overlap the camera and to acquire display area information and border information of each of a plurality of pixels using the shape information. In the present disclosure, therefore, it is sufficient to change only the shape information of the area disposed so as to overlap the camera stored in the memory even in the case in which the size, position, etc. of the camera is changed, whereby it is possible to easily change the shape of the area disposed so as to overlap the camera.

In addition, according to the present disclosure, it is possible to easily acquire the border of the area disposed so as to overlap the camera based only on position information of a starting point and vertical length information, line-based direction information, and width information of the area disposed so as to overlap the camera. In the present disclosure, therefore, it is possible to minimize the amount of information stored in the memory, whereby it is possible to use a small-capacity memory.

In addition, according to the present disclosure, it is possible to acquire the border of the area disposed so as to overlap the camera through simple calculation, whereby computational load is low in processing for individually controlling a general display area and a display area disposed so as to overlap the camera.

In addition, according to the present disclosure, adjustment is performed such that the luminance of each of a plurality of border areas gradually decreases or increases, whereby it is possible to minimize the luminance difference between the areas. In the present disclosure, therefore, it is possible to prevent a lining phenomenon that occurs between display areas having different resolutions from being recognized by a user.

In addition, according to the present disclosure, it is possible to prevent the occurrence of color difference between display areas having different resolutions.

It should be noted that the effects of the present disclosure are not limited to the effects mentioned above, and other unmentioned effects will be clearly understood by those skilled in the art from the above description of the present disclosure.

Those skilled in the art will appreciate that the present disclosure may be embodied in specific forms other than those set forth herein without departing from the technical idea and essential characteristics of the present disclosure.

For example, a data driving device according to the present disclosure may be realized in the form of an IC, and the function of the data driving device may be installed in the IC in the form of a program. In the case in which the function of the data driving device according to the present disclosure is realized as a program, the function of each component included in the data driving device may be realized as specific code, and code for realizing a specific function may be realized as a single program or as a plurality of divided programs.

Therefore, the above embodiments are therefore to be construed in all aspects as illustrative and not restrictive. The scope of the present disclosure is defined by the following claims, rather than the detailed description, and it is intended that all variations or modifications derived from the meaning, scope, and equivalent concept of the claims fall within the scope of the present disclosure.

What is claimed is:

1. A display device comprising:
a display panel having a plurality of pixels, the display panel comprising a first display area having a first resolution and a second display area having a second resolution, the second resolution being lower than the first resolution; and
a controller configured to generate border information of pixels provided in a border area located within a predetermined range from a border between the first display area and the second display area, to change an image that is displayed in the border area based on the border information, and to perform control such that the changed image is displayed on the display panel;
wherein the border information comprises a border value of each of a plurality of pixels decided based on a position in a kernel consisting of m rows and m columns (m being a natural number greater than 2) at which a border pixel is disposed.

2. The display device according to claim 1, wherein the controller adjusts luminance of image data of the pixels provided in the border area.

3. The display device according to claim 1, wherein the controller performs adjustment such that luminance of image data of the pixels provided in the border area has a value between luminance of image data of pixels provided in an area other than the border area in the first display area and luminance of image data of pixels provided in an area other than the border area in the second display area.

4. The display device according to claim 3, wherein the controller performs adjustment such that the luminance of the image data of the pixels provided in the border area has a value higher than luminance of an image displayed in the area other than the border area in the first display area and lower than luminance of an image displayed in the area other than the border area in the second display area.

5. The display device according to claim 1, wherein the border area comprises a first border area disposed in the first display area so as to be adjacent to the border and a second border area disposed in the second display area so as to be adjacent to the border.

6. The display device according to claim 5, wherein the controller performs adjustment such that luminance of image data of pixels provided in the first border area and luminance of image data of pixels provided in the second border area have different values.

7. The display device according to claim 6, wherein the controller performs adjustment such that the luminance of the image data of the pixels provided in the first border area has a lower value than the luminance of the image data of the pixels provided in the second border area.

8. The display device according to claim 5, wherein
a plurality of first border areas is provided, and
the controller performs adjustment such that luminance of image data of pixels provided in each of the plurality of first border areas gradually increases with decreasing distance from the second display area.

9. The display device according to claim 5, wherein
a plurality of second border areas is provided, and
the controller performs adjustment such that luminance of image data of pixels provided in each of the plurality of second border areas gradually decreases with decreasing distance from the first display area.

10. The display device according to claim 1, wherein
the border area comprises an upper border area disposed in an upward direction based on a central area of the second display area, a lower border area disposed in a downward direction based on the central area of the second display area, a left border area disposed in a leftward direction based on the central area of the second display area, and a right border area disposed in a rightward direction based on the central area of the second display area, and
the controller independently adjusts luminance of image data of pixels provided in each of the upper border area, the lower border area, the left border area, and the right border area.

11. The display device according to claim 1, further comprising:
a memory configured to store shape information of the second display area comprising position information of a starting point, vertical length information of the second display area, and line-based direction information and width information for indicating a border of the second display area, wherein the controller generates the border information of the pixels provided in the border area using the shape information of the second display area.

12. The display device according to claim 11, wherein the controller extracts a border pixel of each line based on the position information of the starting point, the line-based direction information, and the width information, and decides a border value of a pixel disposed at a center of the kernel based on a position in the kernel at which the border pixel is disposed.

13. The display device according to claim 12, wherein pixels provided in the first display area, among the plurality of pixels provided in the border area, have border values that decrease with increasing distance from the border pixel, and pixels provided in the second display area, among the plurality of pixels provided in the border area, have border values that increase with increasing distance from the border pixel.

14. The display device according to claim 12, wherein the controller performs adjustment such that image data of pixels having an identical border value have identical luminance.

15. The display device according to claim 12, wherein the controller performs adjustment such that luminance of image data of each of the pixels provided in the border area is proportional to the border value.

16. A controller comprising:

a border information generation unit configured to generate border information of pixels provided in a border area located within a predetermined range from a border between a first display area and a second display area having lower resolution than the first display area based on shape information of the second display area;

an image processing unit configured to adjust luminance of image data of the border area based on the border information; and a control unit configured to perform control such that an image having the adjusted luminance is displayed on a display panel;

wherein the image processing unit comprises an area decision unit configured to decide image data of pixels, the border information of each of which has a border value greater than 0, among input image data, as image data of the border area.

17. The controller according to claim 16, wherein the image processing unit comprises a luminance adjustment unit configured to perform adjustment such that image data of pixels provided in an area other than the border area in the first display area have first luminance, image data of pixels provided in an area other than the border area in the second display area have second luminance, the second luminance being higher than the first luminance, and image data of pixels provided in the border area have third luminance, the third luminance being between the first luminance and the second luminance.

18. The controller according to claim 17, wherein the border area comprises a first border area disposed in the first display area so as to be adjacent to the border and a second border area disposed in the second display area so as to be adjacent to the border, and the luminance adjustment unit performs adjustment such that luminance of image data of pixels provided in the first border area has a lower value than luminance of image data of pixels provided in the second border area.

19. The controller according to claim 18, wherein a plurality of first border areas is provided, and the luminance adjustment unit performs adjustment such that luminance of image data of pixels provided in each of the plurality of first border areas gradually increases with decreasing distance from the second display area.

20. The controller according to claim 18, wherein a plurality of second border areas is provided, and the luminance adjustment unit performs adjustment such that luminance of image data of pixels provided in each of the plurality of second border areas gradually decreases with decreasing distance from the first display area.

* * * * *